(12) United States Patent
Prothe

(10) Patent No.: US 12,486,872 B2
(45) Date of Patent: *Dec. 2, 2025

(54) METHOD AND APPARATUS FOR ADDITIVE FRICTION STIR MANUFACTURED TRANSITION JOINT

(71) Applicant: DMC Global Inc., Broomfield, CO (US)

(72) Inventor: Curtis Erwin Prothe, Brevard, NC (US)

(73) Assignee: DMC Global Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,391

(22) Filed: Jun. 27, 2024

(65) Prior Publication Data

US 2024/0344567 A1 Oct. 17, 2024

Related U.S. Application Data

(63) Continuation of application No. 17/521,438, filed on Nov. 8, 2021, now Pat. No. 12,055,186.

(Continued)

(51) Int. Cl.
*F16D 1/027* (2006.01)
*B23K 101/06* (2006.01)
(Continued)

(52) U.S. Cl.
CPC ............. *F16D 1/027* (2013.01); *F16C 3/023* (2013.01); *B23K 2101/06* (2018.08); *B23K 2103/20* (2018.08)

(58) Field of Classification Search
CPC .... B23K 20/085; B23K 20/12; B23K 20/129; B23K 20/16; B23K 20/165;
(Continued)

(56) References Cited

U.S. PATENT DOCUMENTS 1,871,371 A * 8/1932 Jackson ................ C04B 35/632
174/138 R
3,048,433 A * 8/1962 Doetsch .................. C21C 7/064
313/332

(Continued)

FOREIGN PATENT DOCUMENTS

CN 201129954 A 10/2008
CN 103097071 A 5/2013
(Continued)

OTHER PUBLICATIONS

Korean Intellectual Property Office; Notice of Non-Final Rejection issued in Korean Application No. 10-2023-7019030 dated Nov. 27, 2024, 7 pages.

(Continued)

*Primary Examiner* — Josh Skroupa
(74) *Attorney, Agent, or Firm* — Womble Bond Dickinson (US) LLP

(57) ABSTRACT

A dissimilar metal article may include a first metallic component including a first metal material, a second metallic component comprising a second metal material, and a transition joint provided between and bonding a first metallic component first end surface to a second metallic component first end surface. An additive flow material may be further provided to the dissimilar metal article to strengthen the joint between the first metallic component and the second metallic component.

16 Claims, 9 Drawing Sheets

Related U.S. Application Data

(60) Provisional application No. 63/110,510, filed on Nov. 6, 2020.

(51) Int. Cl.
  *B23K 103/20* (2006.01)
  *F16C 3/02* (2006.01)

(58) Field of Classification Search
  CPC ............ B23K 20/2275; B23K 37/0443; B23K 2103/18; B23K 2103/20; F16C 3/023; F16D 1/027; F16D 1/068; F16D 2250/0076; Y10T 403/47; Y10T 403/473; Y10T 403/477; Y10T 403/478; Y10T 403/479; Y10T 403/57; Y10T 403/5733
  USPC ....... 403/265, 268, 270, 271, 272, 300, 305; 464/182, 183
  See application file for complete search history.

(56) References Cited

U.S. PATENT DOCUMENTS

| | | | | |
|---|---|---|---|---|
| 4,073,427 | A | * | 2/1978 | Keifert .................. B23K 9/23 228/175 |
| 5,348,210 | A | * | 9/1994 | Linzell .................. B23K 20/16 228/115 |
| 5,421,781 | A | * | 6/1995 | Mackellar ............... F16D 1/068 464/181 |
| 5,613,794 | A | * | 3/1997 | Isaac .................... B62K 19/16 280/281.1 |
| 6,045,028 | A | | 4/2000 | Martin et al. |
| 6,367,788 | B1 | * | 4/2002 | Babchuk ............ B23K 37/0443 269/45 |
| 6,773,354 | B2 | * | 8/2004 | Marriott ................. F16D 1/068 464/180 |
| 8,397,974 | B2 | | 3/2013 | Schultz et al. |
| 8,875,976 | B2 | | 11/2014 | Schultz et al. |
| 8,893,954 | B2 | | 11/2014 | Schultz et al. |
| 9,073,144 | B2 | * | 7/2015 | Biesenbach ........ B23K 15/0046 |
| 9,073,151 | B2 | | 7/2015 | Okauchi et al. |
| 9,227,375 | B2 | * | 1/2016 | Carrere ................. F16B 11/006 |
| 9,869,182 | B2 | * | 1/2018 | Albuzat ................. F16D 1/027 |
| 9,943,929 | B2 | | 4/2018 | Schultz et al. |
| 10,105,790 | B2 | | 10/2018 | Kandasamy |
| 10,309,446 | B2 | * | 6/2019 | Katayama ............... F16C 3/023 |
| 10,369,748 | B2 | | 8/2019 | Whalen et al. |
| 10,500,674 | B2 | | 12/2019 | Kandasamy et al. |
| 10,543,570 | B2 | * | 1/2020 | Argentine ............ B23K 9/0286 |
| 10,583,631 | B2 | | 3/2020 | Kandasamy et al. |
| 11,767,050 | B2 | | 9/2023 | Burkhard et al. |
| 2005/0133527 | A1 | | 6/2005 | Dulea et al. |
| 2005/0263568 | A1 | | 12/2005 | Stol et al. |
| 2012/0315082 | A1 | * | 12/2012 | Linzell ................. B23K 20/021 264/249 |
| 2014/0016995 | A1 | * | 1/2014 | Wilson ................. F16B 11/008 156/60 |
| 2014/0112709 | A1 | | 4/2014 | Okauchi et al. |
| 2014/0151438 | A1 | | 6/2014 | Fleck et al. |
| 2016/0017909 | A1 | * | 1/2016 | Erlacher ............... F16B 11/008 403/265 |
| 2017/0320160 | A1 | | 11/2017 | Schmicker et al. |
| 2018/0361501 | A1 | | 12/2018 | Hardwick et al. |
| 2019/0255639 | A1 | * | 8/2019 | Grummon .............. B23K 20/16 |
| 2020/0016687 | A1 | | 1/2020 | Whalen et al. |
| 2020/0306869 | A1 | | 10/2020 | Hardwick et al. |

FOREIGN PATENT DOCUMENTS

| | | | | |
|---|---|---|---|---|
| CN | 103619523 | A | | 3/2014 |
| CN | 104202285 | B | | 12/2014 |
| CN | 104859780 | B | | 2/2017 |
| CN | 211853077 | U | | 11/2020 |
| EP | 1760346 | A2 | * | 3/2007 ............. F16D 1/027 |
| GB | 2004980 | A | * | 4/1979 ............. F16D 1/027 |
| JP | S6360787 | A | | 4/1988 |
| JP | 3825140 | B2 | | 9/2006 |
| JP | 2013006184 | A | | 1/2013 |
| JP | 2019511636 | A | | 4/2019 |
| KR | 10-2012-0101669 | | | 9/2012 |
| KR | 10-2016-0117619 | | | 10/2016 |
| RU | 2219027 | C2 | | 12/2003 |
| WO | 2019160772 | A1 | | 8/2019 |
| WO | 2019178138 | A3 | | 10/2019 |
| WO | 2019246251 | | | 2/2020 |
| WO | 2020055989 | A1 | | 3/2020 |
| WO | 2020106952 | A1 | | 5/2020 |

OTHER PUBLICATIONS

Japanese Patent Office; Office Action issued on May 28, 2024 for Japanese Application No. 2023-524415, 13 pages with English translation.
U.S. Patent and Trademark Office; Search Report and Written Opinion issued in PCT/US21/58440 dated Mar. 22, 2022; 11 pages.
Japanese Patent Office; Office Action issued on Oct. 15, 2024 for Japanese Application No. 2023-524415, 10 pages.
China National Intellectual Property Administration; Office Action issued for CN 202180074738.0; dated Mar. 24, 2025; 9 pages.
European Patent Office; Extended European Search Report issued for EP 21890233.6; Feb. 14, 2025; 13 pages.
Korean Intellectual Property Office; Notice of Allowance issued for KR 10-2023-7019030; dated Aug. 13, 2025; 8 pages.
The State Intellectual Property Office of People's Republic of China; Office Action issued for Chinese Patent Application No. 202180074738.0; dated Sep. 23, 2025; 5 pages.

* cited by examiner

METHOD AND APPARATUS FOR ADDITIVE FRICTION STIR MANUFACTURED TRANSITION JOINT

CROSS-REFERENCE TO RELATED APPLICATIONS

This application is a continuation of U.S. application Ser. No. 17/521,438 filed Nov. 8, 2021, which claims the benefit of priority to U.S. Provisional Application No. 63/110,510 filed Nov. 6, 2020, the entire contents of each which are incorporated by reference herein in their entireties.

BACKGROUND OF THE DISCLOSURE

Transition joints have typically been machined from explosion welded clad plates or pipes to bond two dissimilar metals, e.g., aluminum and steel, to one another. However, in some applications, failures in joints formed from these processes can result in equipment damage, operator injury, and potentially loss of life. The risks and difficulties during production and field welding are more problematic when the transition joint is larger. The resulting transition joint formed from solid-state welding can be weakened due to overheating of the joint components during welding. When joining larger parts with heavier wall thickness, the limitations of the plate thickness begin to affect the weld joint geometry and proximity of weld to the welded interface(s). In addition, the manufacturing costs are quite high as multiple interlayers with multiple explosion welding shots and plate qualification testing is required.

In view of disadvantages associated with currently available methods for manufacturing transition joints between two dissimilar metals, there is a need for a transition joint and process of manufacturing the same that creates a more reliable joint.

BRIEF DESCRIPTION OF THE EXEMPLARY EMBODIMENTS

In an embodiment, a dissimilar metal article may include a first metallic component formed from a first metal material, a second metallic component formed from a second metal material, and a transition joint provided between and bonding a first metallic component first end surface to a second metallic component first end surface. A collar formed from an additive flow material is bonded to each of a first metallic component outer surface, a second metallic component outer surface, and the transition joint.

In an embodiment, a method of producing a dissimilar metal article may include aligning a first metallic component with a second metallic component, forming a transition joint between a first metallic component first end surface and a second metallic component first end surface, and forming a collar around the transition joint and at least a portion of a first metallic component outer surface and a second metallic component outer surface. The first metallic component may comprise steel or stainless steel and the second metallic component may comprise aluminum or an aluminum alloy.

An exemplary embodiment of a dissimilar metal article may include a yoke and a pipe. The yoke may include a yoke outer surface, a plurality of divots formed in the yoke outer surface, and a flared portion sloping radially outward from the outer surface. The pipe may include a pipe inner surface defining a pipe interior. The flared portion may be provided in the pipe interior and may abut the pipe inner surface so as to form a gap between the pipe inner surface and the yoke outer surface. The yoke and the pipe may be joined by friction stir welding. The additive flow material at least partially fills the plurality of divots and the gap between the pipe inner surface and the yoke outer surface.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Figure 1:
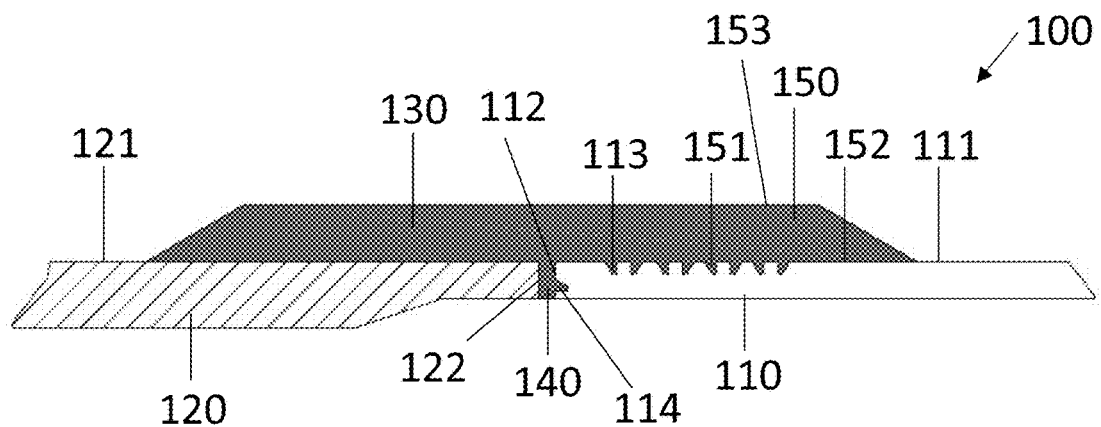
FIG. 1 is a dissimilar metal article, according to an embodiment.

Various features, aspects, and advantages of the embodiments will become more apparent from the following detailed description, along with the accompanying figures in which like numerals represent like components throughout the figures and text. The various described features are not necessarily drawn to scale but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments.

FIG. 1 shows an exemplary embodiment of a dissimilar metal article, namely, a transition joint pipe 100. In the exemplary embodiment, an upper half of the transition joint pipe 100 is shown from a cross-sectional view. The pipe 100 may include a first metallic component 110 and a second metallic component 120. In an exemplary embodiment, the first metallic component 110 may be formed of a material such as a stainless steel, carbon steel, titanium, nickel, aluminum, or alloys including any of these materials. In an exemplary embodiment, the second metallic component 120 may be formed of a material, such as a stainless steel, carbon steel, titanium, nickel, aluminum, or alloys including any of these materials, that is dissimilar to the material forming the first metallic component 110. However, it will be understood that the first metallic component 110 and the second metallic component 120 are not limited to these materials or geometries, and other materials and geometries may be used depending on the requirements of the specific application. For example and not limitation, in an aspect the dissimilar metal article/transition joint apparatus contemplated herein may be provided in a sheet geometry.

Figure 2:
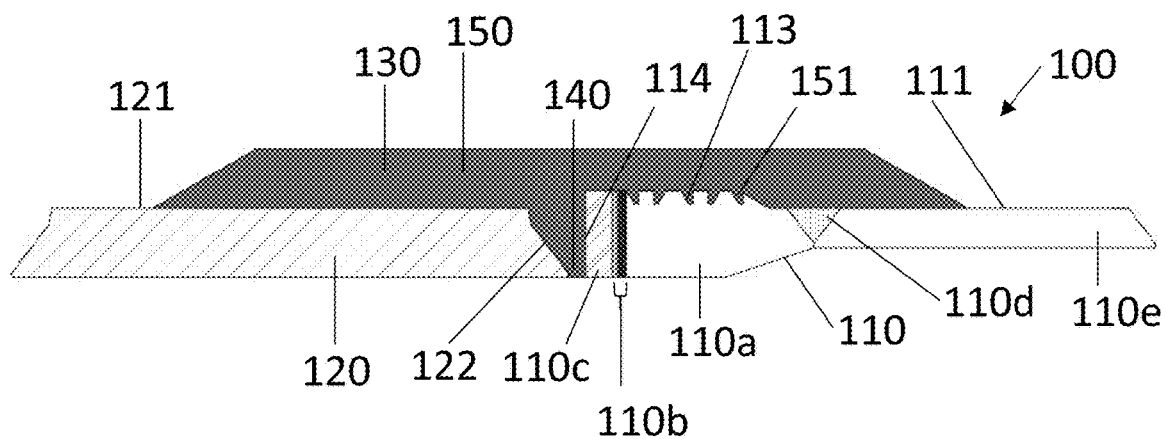
FIG. 2 is a dissimilar metal article including an explosion welded joint, according to an embodiment.

The first metallic component 110 and the second metallic component 120 may be bonded together through a solid-state welding process. In an aspect, the first metallic component 110 and second metallic component 120 may be bonded together through a friction stir welding process, in which heat is generated by friction between a rotating non-consumable tool and two working surfaces (e.g., a first metallic component first end surface 112 and a second metallic component first end surface 122) to soften and intermix the two pieces of metal to produce a transition joint 140. In an aspect, the first metallic component first end surface 112 and the second metallic component first end surface 122 may be machined with a weld preparation prior to the friction stir welding process. In an aspect, a weld preparation may not be required for the friction stir weld. For example and not limitation, a weld preparation may not be required in an embodiment in which the first metallic component first end surface 112 and second metallic component first end surface 122 have a square butt weld geometry. In an embodiment, a weld preparation including weld geometry with a tapered surface and a land may be used. Depending on the application, the first metallic component first end surface 112 and the second metallic component first end surface 122 may each comprise a flat, planar surface. Alternatively, the surfaces 112, 122 may comprise an angled and/or tapered surface (FIG. 2). The weld geometry may be selected depending on the application and factors including the thickness of the pipe. For example, a square butt joint may be used in applications for a thinner wall pipe. For a greater wall thickness, a tapered or angled weld preparation may be used to achieve a full penetration, high quality friction stir weld.

In an aspect, an additive flow material 130 may be distributed at the joint 140 and circumferentially around an outer diameter of the first metallic component 110 and second metallic component 120 to strengthen and reinforce the transition joint pipe 100. According to an aspect, the additive flow material 130 may be an aluminum or aluminum alloy material such as aluminum alloyed with magnesium, manganese, and/or chromium, but is not limited to these compositions. Distribution of the additive flow material 130 may occur concurrently with the friction stir welding process so that the additive flow material 130 intermixes at the joint 140 with the softened metals of the first metallic component 110 and the second metallic component 120 to harden as an intermixed metallic composition comprising the materials of the first metallic component 110, the second metallic component 120, and the additive flow material 130. Additionally, in an exemplary embodiment, the additive flow material 130 may be distributed from the friction stir welding tool as the friction stir welding is performed.

Figure 3:
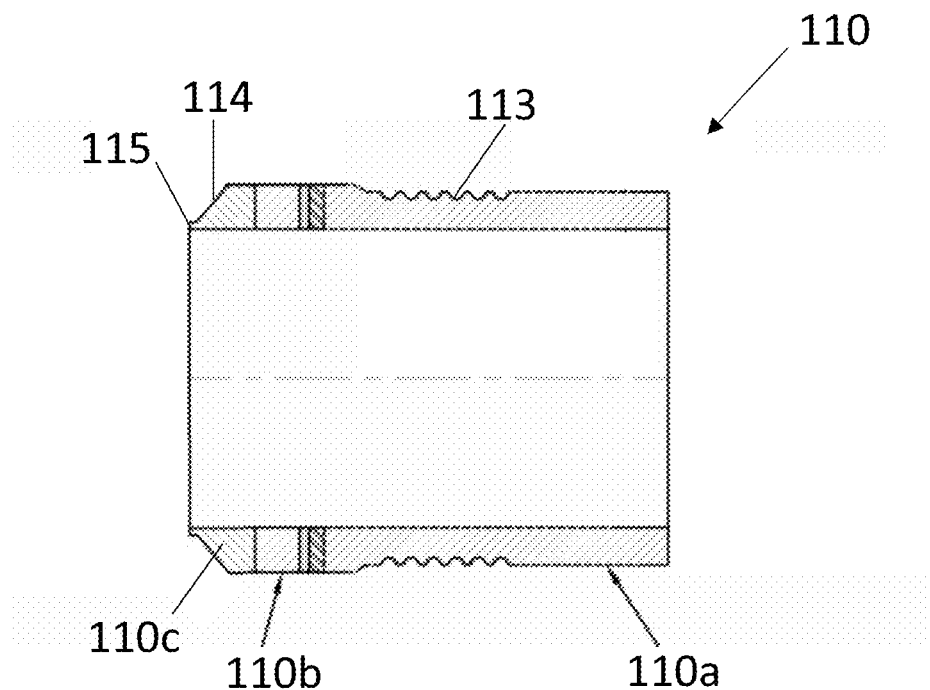
FIG. 3 is a first metallic component for use in a dissimilar metal article, according to an embodiment.
Figure 4:
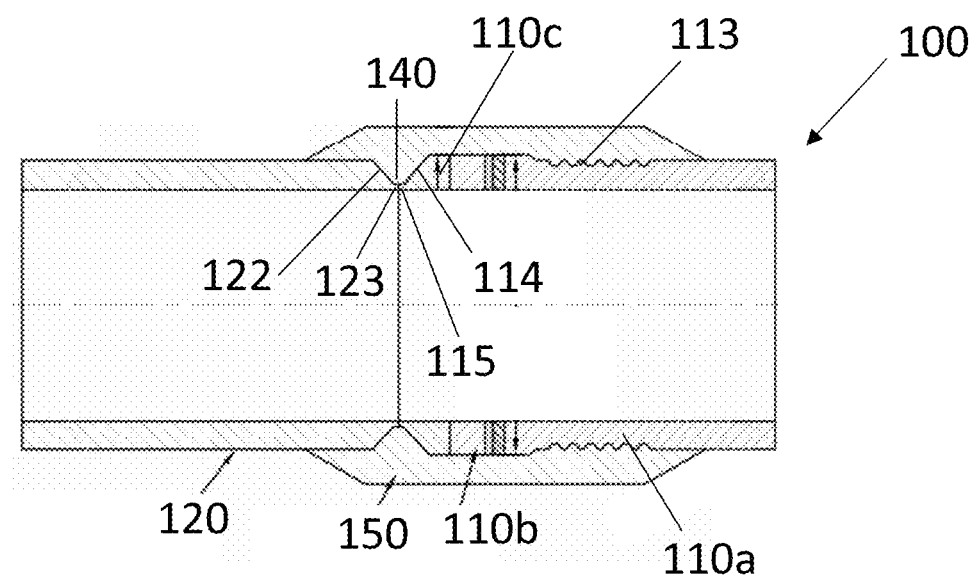
FIG. 4 is a dissimilar metal article including an explosion welded joint, according to an embodiment.

An exemplary embodiment of a transition joint pipe 100 including a cladded first metallic component 110 (FIG. 2) and a second metallic component 120 is illustrated in FIGS. 2-4. Depending on the application, a cladded interlayer 110*b* may be integrated in the cladded metallic component 110 to meet the required joint properties of the transition joint pipe 100. In an aspect, the cladded interlayer 110*b* may comprise a transition ring, illustrated in FIG. 2, that is bonded between a first metallic layer 110*a* and a second metallic layer 110*c* by a solid-state welding process. The first metallic layer 110*a* may be formed from a stainless steel and the second metallic layer 110*c* may be formed from aluminum or an aluminum alloy. A standard aluminum-stainless steel pipe is shown in the exemplary embodiment. However, it will be understood that the first metallic layer 110*a* and the second metallic layer 110*c* are not limited to these materials. Other materials and geometries may be used depending on the requirements of the specific application. For example and not limitation, the cladded first metallic component 110 may include one or more sealing elements provided along the length of the component 110. In an aspect, and depending on the application, a pipe extension 110*e* may be joined to the first metallic layer 110*a* by a welding technique, shown at 110*d*, for example, a traditional fusion weld. In an aspect, a transition joint 110 having a large diameter and/or heavy wall thickness may include an extension, such as pipe extension 110*e*, welded to the first metallic component 110 prior to additive friction stir welding.

Solid-state welding may include a group of welding processes producing bonds/welds between structural elements at temperatures below the melting point of the base materials being joined, without the addition of brazing filler metal. In an exemplary embodiment, solid-state welding may be described as a bonding/welding process (i) without putting a portion of the structural elements through liquid or vapor phase, (ii) with the use of pressure, and (iii) with or without the aid of temperature. Solid-state welding is done over a wide range of pressure and temperature, with appreciable deformation and solid-state diffusion of the base materials. Solid-state welding processes include cold welding, diffusion welding, explosion welding, forge welding, friction welding, hot pressure welding, roll welding, and ultrasonic welding.

Explosion welding ("EXW") is a solid-state welding technique using controlled detonations to force dissimilar metals into a high-quality, metallurgically bonded joint. The transition joint between the dissimilar metals has high mechanical strength, is ultra-high vacuum tight and can withstand drastic thermal excursions. EXW is a solid-phase process where welding or cladding two metals together is accomplished by accelerating one of the components at extremely high velocity through the use of explosives. The process is solid-phase because both components are, at all times, in a solid state of matter. This may be contrasted with other metal-to-metal welding or cladding techniques such as arc-welding, gas welding, hot-dipping, electroplating and vapor deposition, which require at least one component to be liquified, gasified or ionized.

EXW being a solid-state process, it will typically subject both dissimilar metals to far lower process temperatures than liquid or gas-state processes. The crystalline structure of a metal is highly dependent upon the temperatures to which it has been exposed. For some metals, exposure to high temperature processes can alter the physical characteristics of the metal in very detrimental ways, e.g., rendering the metal too brittle for a given application. EXW is commonly utilized to clad carbon steel plate with a thin layer of corrosion resistant material. For example, stainless steel, nickel alloy, titanium, zirconium, silver, and tantalum are non-limiting examples of materials used for the cladded interlayer 110*b*. It will be understood that the cladded interlayer material is not limited to these materials, and other materials may be used as warranted by the particular application. Additionally, other materials aside from stainless steel may be used as the first metallic layer 110*a* and other materials aside from aluminum or aluminum alloy may be used as the second metallic layer 110*c*.

Typical geometries produced by EXW include plates, tubing, tube sheets and cylinders. While either surface, i.e., inner or outer, of tubing and tube sheets may be the cladder layer, for solid cylinders only the external surface may be the cladder layer, for the readily apparent reason that explosives cannot be disposed in a solid cylinder. While limitations, at least from an efficiency perspective, do exist for initial formation of a geometry by EXW, modifications may be made to the standard geometries. That is, once the clad layer is formed by EXW, the clad plate, clad tube, clad tube sheet or clad cylinder may be subjected to a number of post-cladding processes resulting in numerous different shapes. Essentially any forming/machining process may be applied to the clad structure that will not degrade the clad layer.

EXW can produce a bond between two metals that cannot necessarily be welded or otherwise joined together by conventional means. The process does not melt either metal, instead the surfaces of both metals are plasticized while, simultaneously, coming into intimate contact with each other. The plasticization and contact are sufficient to create a weld. This is a similar principle to other non-fusion welding techniques, such as friction welding. Large areas can be bonded extremely quickly and the weld itself is very clean, due to the fact that the surface material of both metals is violently expelled during the reaction. EXW can join a wide array of similar and dissimilar metals.

The transition joint pipe 100 of FIG. 2 may include a transition joint 140 as described above with reference to FIG. 1. In the exemplary embodiment, the transition joint 140 is provided between the first metallic component first end surface 112 (adjacent the second metallic layer 110*c*) and the second metallic component first end surface 122. The transition joint 140 may be formed by friction stir welding and the incorporation of an additive flow material 130 as described in detail with respect to FIG. 1. According to an aspect, the second metallic component first end surface 122 may be welded to the first metallic component first end surface 112, and in the exemplary embodiment, a strong aluminum-aluminum joint is formed between the aluminum second metallic layer 110*c* and the second metallic component 120. In an aspect, the surfaces 122, 112 may be angled or tapered as illustrated in FIGS. 3-4 and may include a respective contacting shoulder 115, 123 for direct surface contact between the cladded first metallic component 120 and the second metallic component 120.

In an aspect and with reference to the exemplary embodiments of FIGS. 1-2, the welding process may include distribution of the additive flow material 130 along a length of an outer surface 111, 121 of each of the first metallic component 110 and the second metallic component 120 to form a collar 150 extending around the transition joint pipe 100. Distribution of the additive flow material 130 may occur concurrently with the friction stir welding process so that the additive flow material 130 intermixes with the softened metal of the first metallic component 110 along the length of the first metallic component 110, and/or the second metallic component 120 along the length of the second metallic component 120. In contrast to explosion welding, the length of the joint 140 and collar 150 is not limited by plate thickness and can be extended as required for the application.

In an aspect, a diffusion bond may be formed between the collar 150 and the first metallic component outer surface 111, that is further reinforced by the interlocking geometry provided by the additive flow material 130 interlocking with a recess 113 that is machined in the first metallic component 110. In an aspect, the first metallic component 110 may include a recess 113 machined into the outer surface 111 into which the additive flow material 130 is applied to interlock the collar 150 with the first metallic component 110. In an aspect, the additive flow material 130 forms a projection 151 extending from an inner surface 152 of the collar 150 to interlock the collar 150 with the first metallic component 110 to reinforce the transition joint 140 against forces acting axially on the transition joint pipe 100. A recess 114 may similarly be machined into the first metallic component first end surface 112 to interlock the additive flow material 130 with the first metallic component 110 to reinforce the transition joint 140 against forces acting radially on the transition joint pipe 100.

According to an aspect, the additive flow material 130 may cool, harden, and contract after application, tightening the tooth-projection interlock between the first metallic component 110 and the collar 150. In an exemplary embodiment, the additive flow material 130 may have a higher coefficient of thermal expansion than that of the material of the first metallic component 110. In this way, the additive flow material 130 may contract more than the material of the first metallic component 110 when cooling, such that the additive flow material 130 will contract and tighten around the first metallic component 110 and the recesses 113, 114, thereby increasing the strength of the connection between the additive flow material 130 and the first metallic component 110. In an embodiment, the recesses 113, 114 may be machined up to about ¼-inch. In an embodiment, the recesses 113, 114 may be machined up to about ⅛-inch. In an embodiment, the recesses 113, 114 may have a dovetail profile for interlocking with a correspondingly dimensioned dovetail projection 151 formed from deposit of the additive flow material 130 as described above.

In an exemplary embodiment, the additive flow material 130 strengthens and reinforces the joint between the first metallic component 110 and the second metallic component 120. Accordingly, the apparatus and methods described herein may help to reduce and/or prevent equipment damage, personal injury, and deaths caused by joint failures in field applications.

After cooling and hardening of the additive flow material 130, an outer surface 153 of the collar 150 may be finished to a selected outer diameter. In an aspect, the collar may be machined with, for example, a lathe, to the selected outer diameter to provide a consistent outer diameter measurement along the length of the collar 150.

Figure 5:
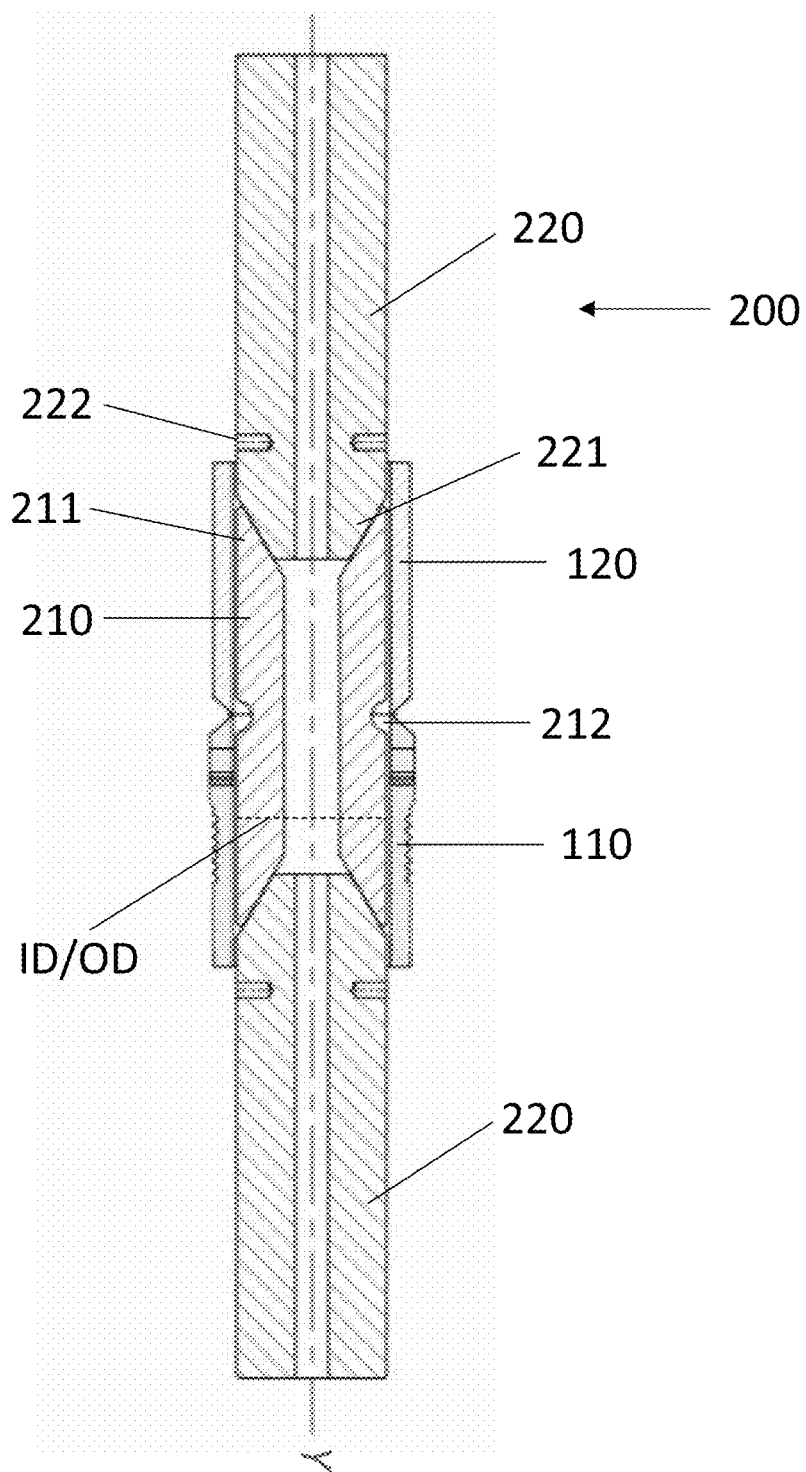
FIG. 5 is a tooling jig assembly for a dissimilar metal article, according to an embodiment.
Figure 6A:
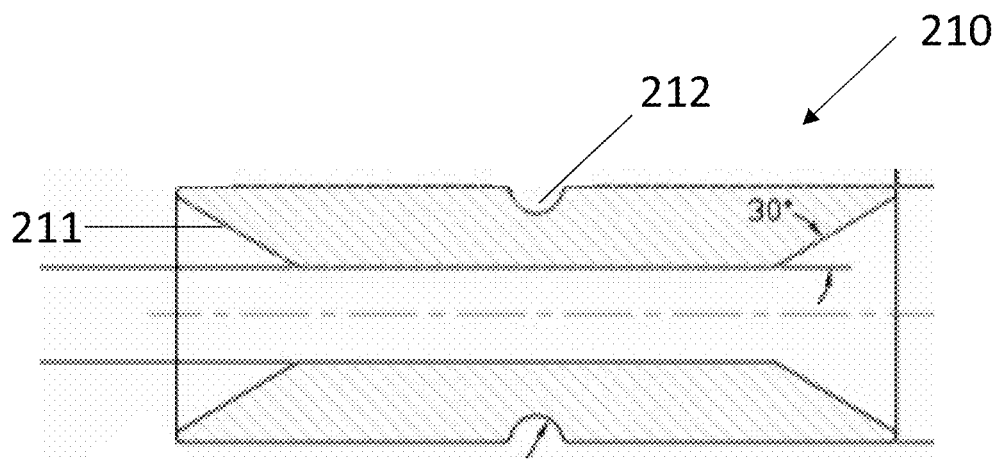
FIG. 6A is a female tooling jig component, according to an embodiment.
Figure 6B:
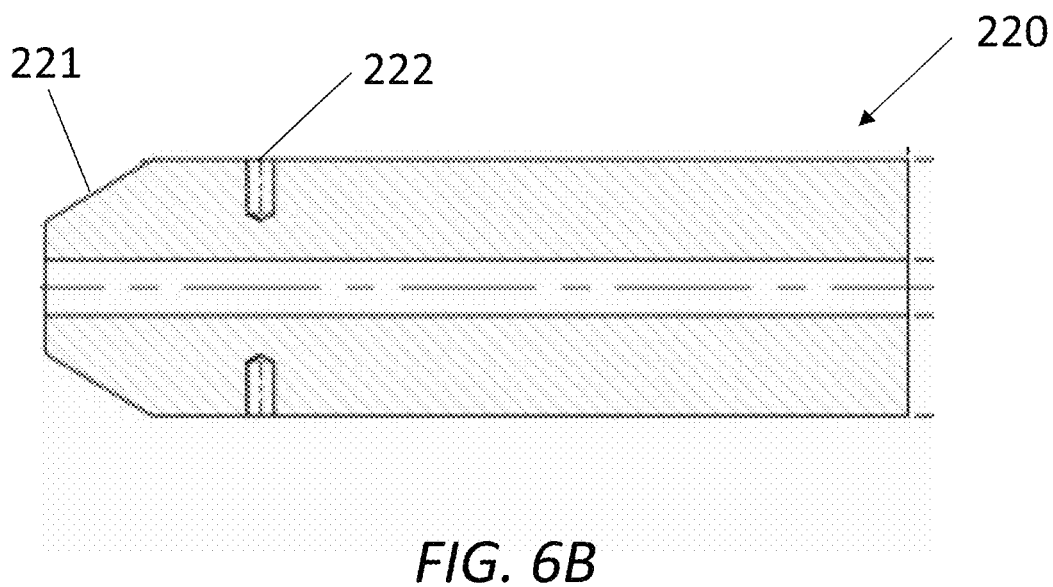
FIG. 6B is a male tooling jig component, according to an embodiment.

With reference to FIGS. 5-6, the friction stir welding process may include fixturing of the first metallic component 110 in alignment with the second metallic component 120 with the use of tooling jig assembly 200 including a female tooling jig component 210 and a male tooling jig component 220. In the exemplary embodiment, the first metallic component 110 and the second metallic component 120 comprise pipe segments of an equal inner diameter ID. The female tooling jig component 210 has an outer diameter OD corresponding to the inner diameter ID of the metallic components 110, 120 so that the female tooling jig component 210 can be inserted through each of the metallic components 110, 120 to retain axial alignment of the metallic components with one another. In an aspect, the outer diameter of the first metallic component 110 and the second metallic component 120 may be about 3 inches. In another aspect, the outer diameter may be about 14 inches.

A tapered end 221 of the male tooling jig component 220 is inserted into a corresponding open end 211 of the female tooling jig component 210. In an exemplary embodiment, during the friction stir welding, the tooling jig assembly 200 and metallic components 110, 120 are loaded onto a machine, for example similar in concept to a lathe, and secured in position with pins that are inserted into pinholes 222 formed in the male tooling jig component 220. The metallic components 110, 120 are then welded as described above and additive flow material 130 is distributed along the welded area and the selected length of the outer surfaces 111, 121 of the metallic components 110, 120 to form the collar 150. Divots 212 are provided on the surface of the female jig component 210 and may be positioned or aligned with the end surfaces of the first metallic component 110 and second metallic component 120 to produce the welded transition joint 140. In an aspect, the divots 212 may provide relief or space for the flow of additive flow material across the first metallic component and second metallic component end surfaces during friction stir welding. In an exemplary embodiment, the metallic components 110, 120 may be rotated around a longitudinal axis Y and/or translated along the longitudinal axis while the friction stir welding tool is maintained in a constant position. In another exemplary embodiment, the metallic components may be rotated around the longitudinal axis while the friction stir welding tool is moved along the longitudinal axis. In other exemplary embodiments, the metallic components may be held constant while a gantry revolves the friction stir welding tool around the longitudinal axis and translates the tool along the longitudinal axis. In an aspect, additive friction stir welding produces a full penetration weld. In an aspect, the inner diameter of the transition joint 110 may be machined after additive friction stir welding so that there is a flush, smooth inner diameter on the finished part.

Figure 7A:
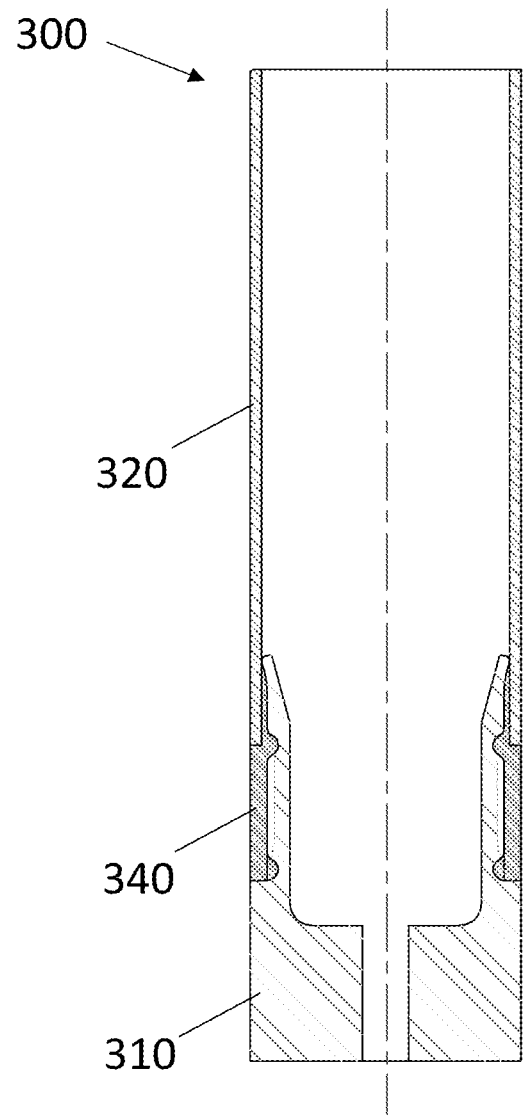
FIG. 7A is a dissimilar metal article according to an exemplary embodiment.
Figure 7B:
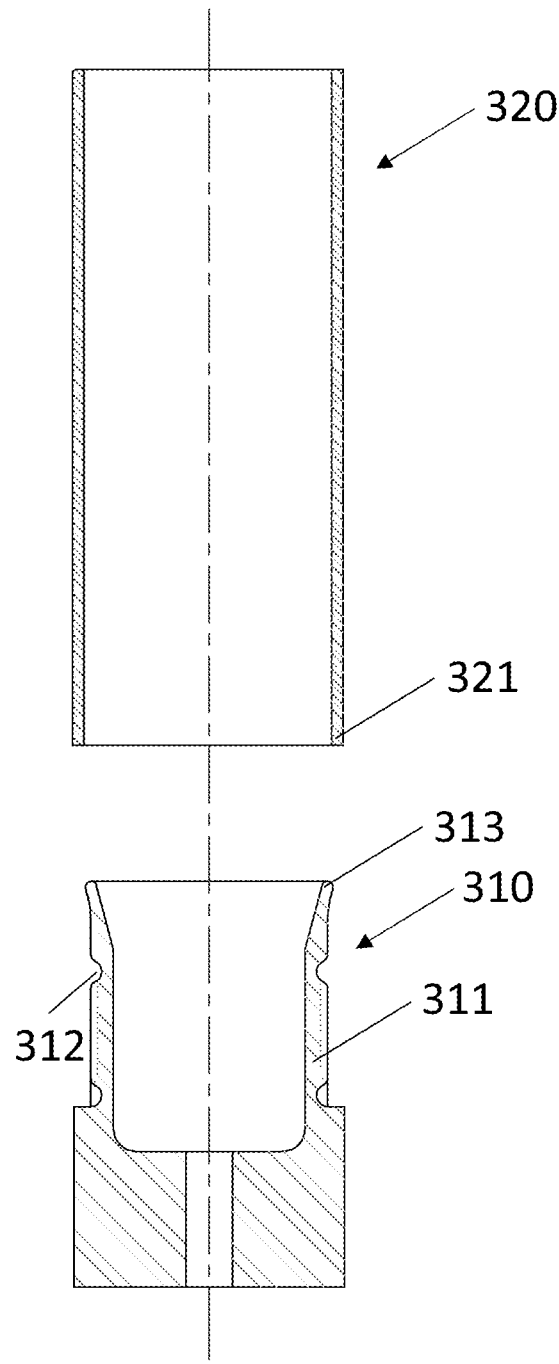
FIG. 7B is a dissimilar metal article according to an exemplary embodiment.

In an exemplary embodiment and as shown in FIGS. 7A-7B, a transition joint 300 may include a first metallic component 310 in the form of a steel hub or yoke and a second metallic component 320 in the form of a pipe comprising aluminum or an aluminum alloy, wherein a transition joint 340 is formed between the steel hub and the pipe. In an alternative exemplary embodiment, the second metallic compound may comprise titanium or a titanium alloy. In an aspect, the steel hub and the pipe may have a similar outer diameter, for example, about 3 inches. The end 313 of the neck 311 may be inserted into an open end 321 of the pipe 320 and additive flow material may be deposited to the materials as described above to form the transition joint 340. In the exemplary embodiment, the neck 311 of the hub 310 includes divots 312 for receiving the additive flow material that is deposited to form the transition joint 340. The embodiment illustrated in FIGS. 7A-7B may be used in applications such as connecting shafts for transmitting torque.

FIG. 8 through FIG. 11 show a further exemplary embodiment of a dissimilar metal article that may be used in applications such as connecting shafts for transmitting torque.

Figure 8:
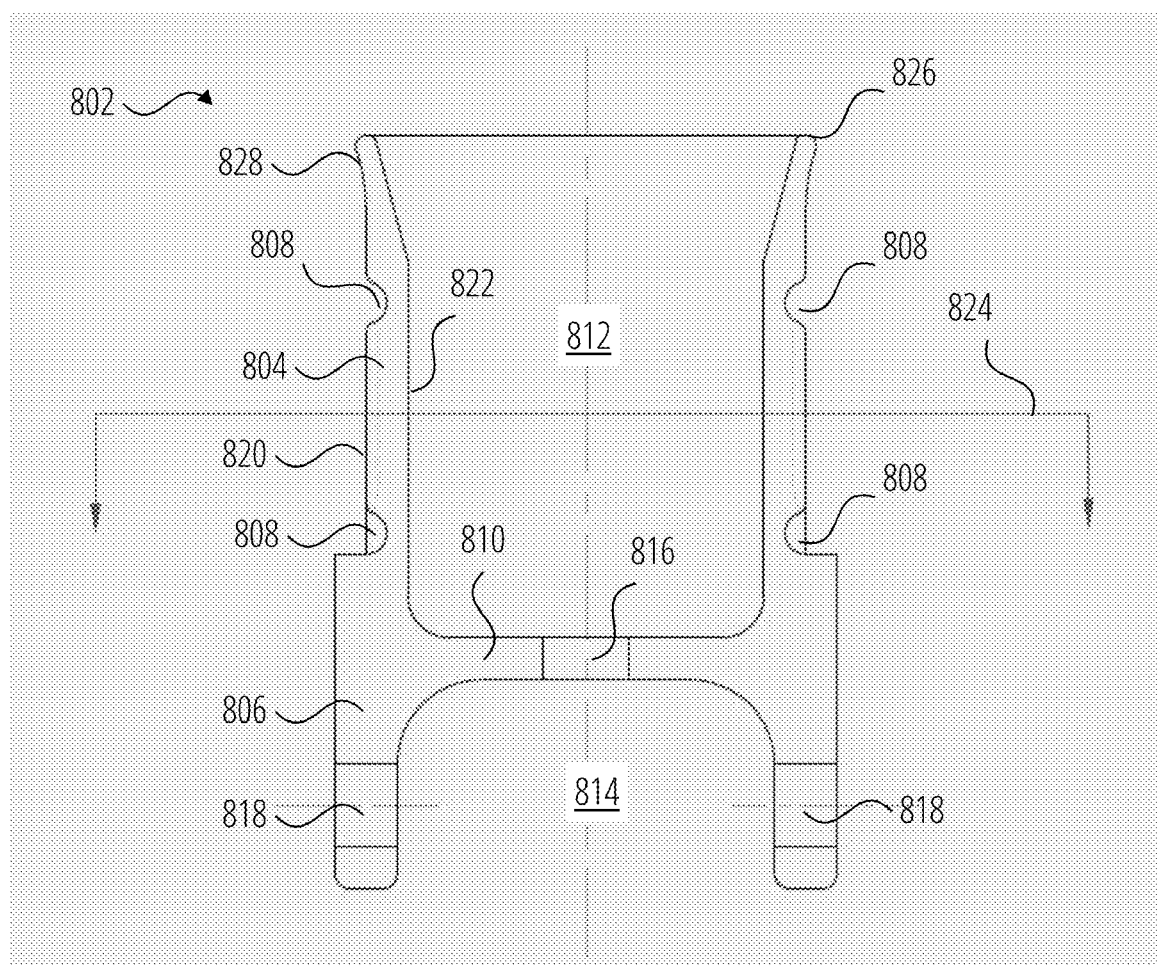
FIG. 8 shows a longitudinal cross section of a yoke according to an exemplary embodiment.

FIG. 8 shows an exemplary embodiment of a yoke 802. The yoke 802 may include steel, and may be formed as a generally tubular structure. The yoke 802 may have a first portion 804 and a second portion 806, with the first portion 804 having an outer diameter that is smaller than an outer diameter of the second portion 806. Divots 808 may be formed in a first portion outer surface 820 of the first portion 804. An interior of the yoke 802 may include a first cavity 812 and a second cavity 814 separated by an interior axial wall 810. The first cavity 812 may be partially bound by a first portion inner surface 822. A bore 816 may be formed in the interior axial wall 810, thereby establishing connecting the first cavity 812 to the second cavity 814. Radial holes 818 may be formed through the yoke 802 in the second portion 806, connecting the second cavity 814 to an exterior of the yoke 802. The radial holes 818 may be used for connecting to a drive system to enable transfer of torque from the drive system to the yoke 802 or from the yoke 802 to the drive system. The yoke 802 may further include a flared portion 828 at the yoke first end 826, such that the flared portion 828 gradually extends slightly outward from the first portion outer surface 820 in a radial direction.

Figure 9A:
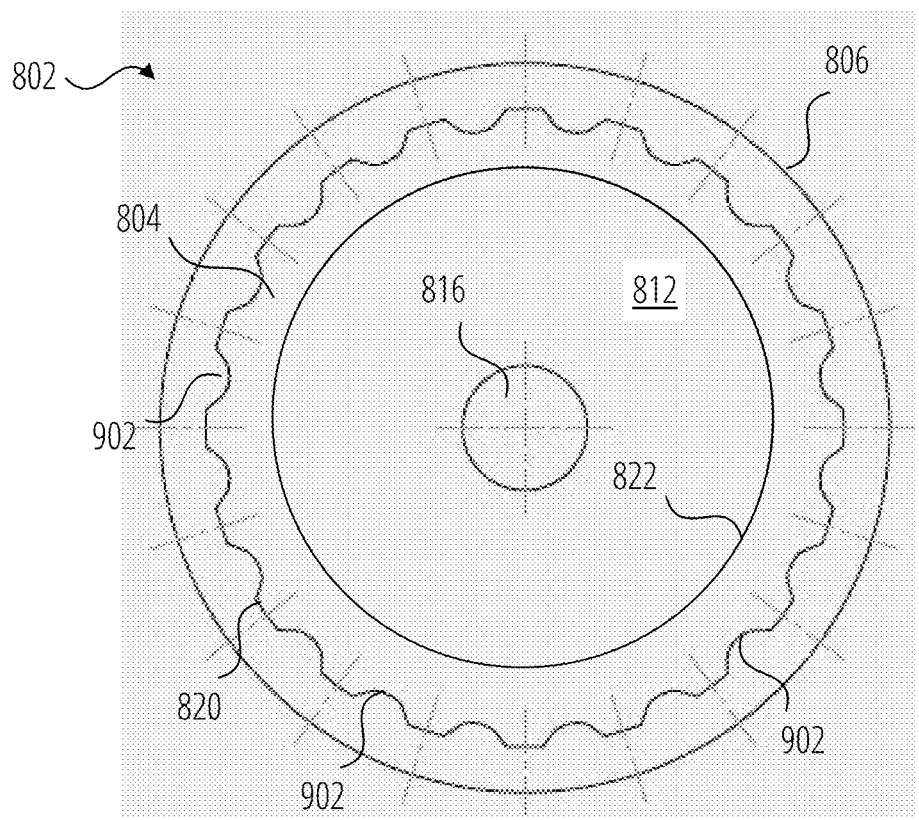
FIG. 9A shows a transverse cross section of a yoke according to an exemplary embodiment.
Figure 9B:
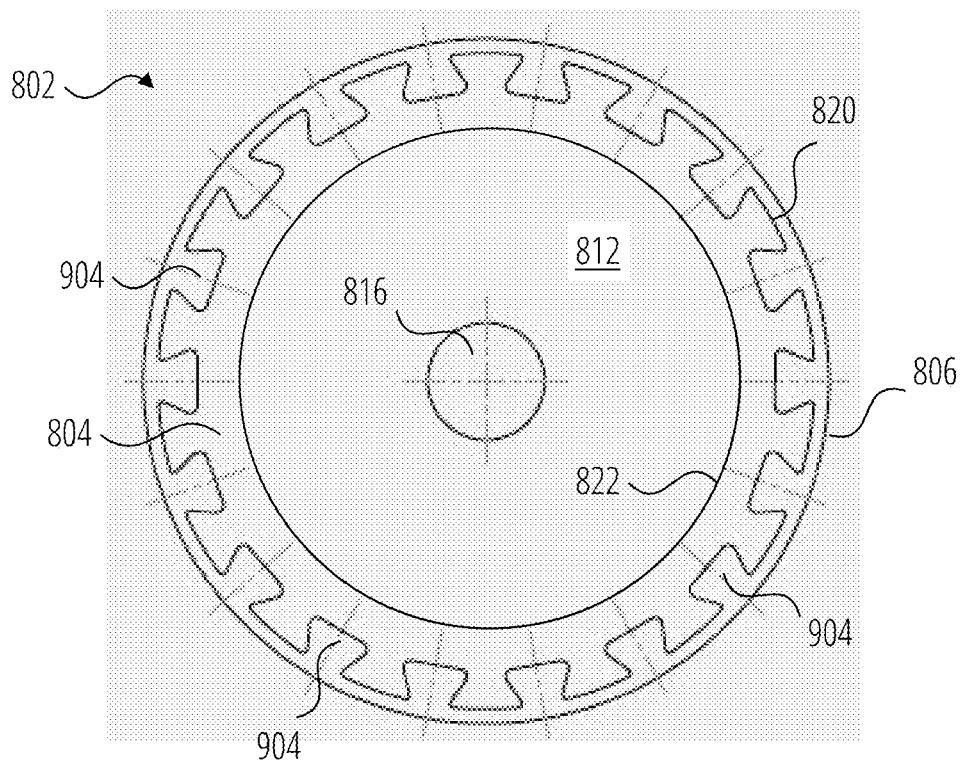
FIG. 9B shows a longitudinal cross section of a yoke according to an exemplary embodiment.

FIG. 9A shows an exemplary embodiment of a transverse cross section of the yoke 802 taken along cross section line 824 shown in FIG. 8. As seen in FIG. 9A, a plurality of grooves 902 may be formed in the first portion outer surface 820 of the first portion 804. FIG. 9B shows an alternative exemplary embodiment of a transverse cross section of the yoke 802 taken along the cross section line 824 shown in FIG. 8. As seen in FIG. 9B, a plurality of dovetail grooves 904 may be formed in the first portion outer surface 820 of the first portion 804. The grooves 902 and the dovetail grooves 904 may provide a channel into which additive flow material during joining of the yoke 802 to a pipe 1002 (see FIG. 10 and FIG. 11). The flow of the additive flow material into the grooves 902 or the dovetail grooves 904 may help to prevent relative rotation between the yoke 802 and the pipe 1002, thereby allowing the transfer of torque between the yoke 802 and the pipe 1002

Figure 10:
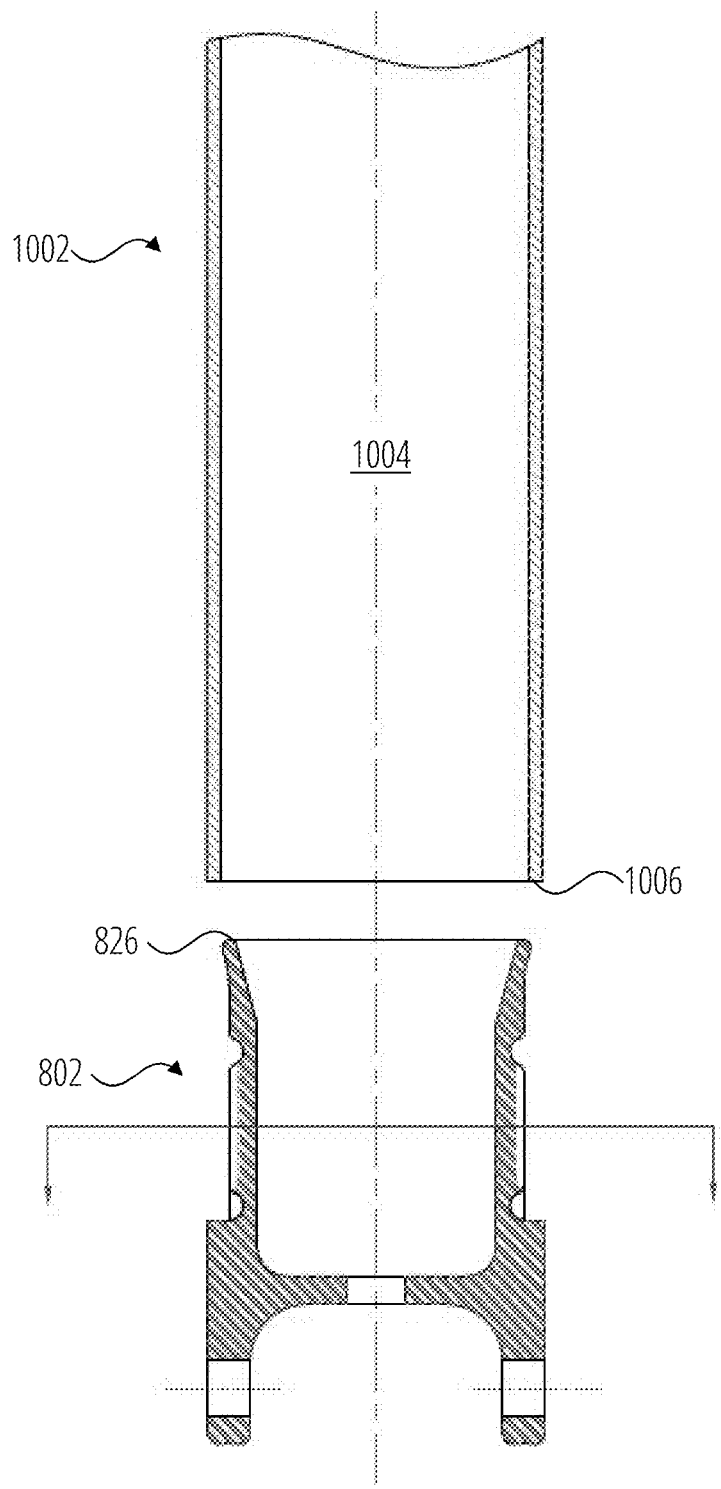
FIG. 10 shows a longitudinal cross section of a disassembled yoke and pipe according to an exemplary embodiment and FIG. 11 shows a longitudinal cross section of an assembled yoke and pipe according to an exemplary embodiment.

FIG. 10 shows a longitudinal cross section of a disassembled yoke 802 and pipe 1002. The pipe 1002 may be a generally tubular structure comprising aluminum, titanium, or alloys or aluminum or titanium. The pipe 1002 may have a pipe interior 1004. A yoke first end 826 of the yoke 802 may be positioned proximate to a pipe first end 1006.

Figure 11:
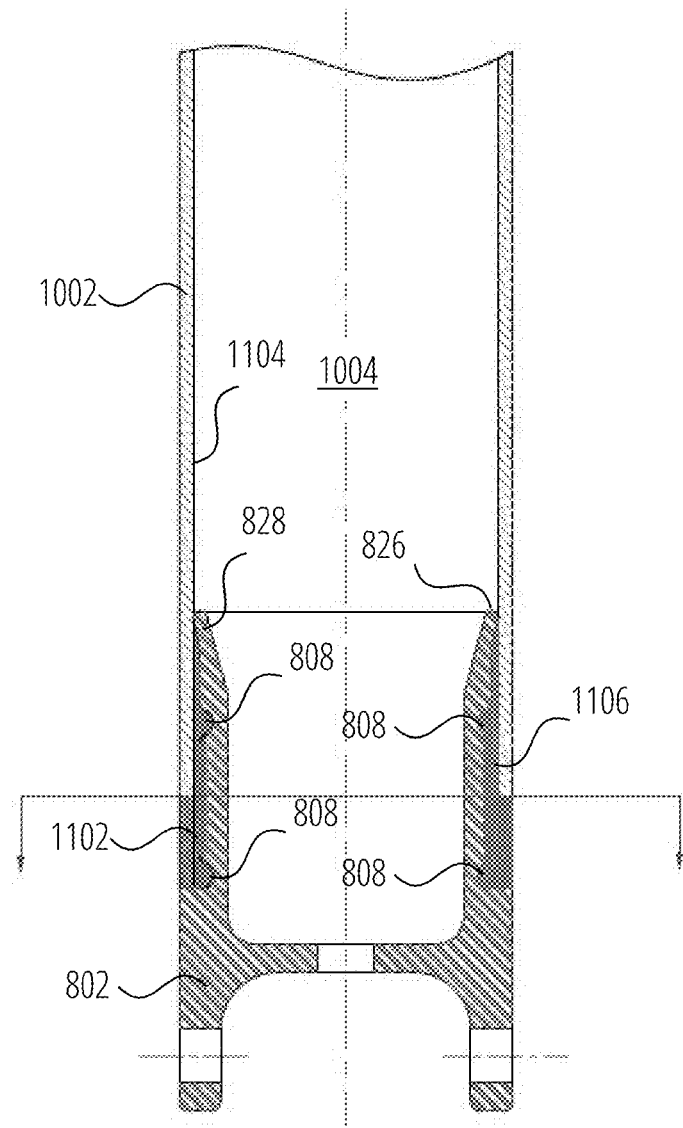

FIG. 11 shows a longitudinal cross section of an assembled yoke 802 and pipe 1002. As seen in FIG. 11, the yoke first end 826 may me inserted into the pipe interior 1004. The yoke 802 may be joined to the pipe 1002 via an additive friction stir welding process described above in order to form a transition joint 1102 between the yoke 802 and the pipe 1002. The flared portion 828 of the yoke 802 may abut a pipe inner surface 1104 of the pipe 1002, and, because the flared portion 828 may have a slightly larger outer diameter than the first portion outer surface 820 of the yoke 802, a gap 1106 may be formed between the pipe inner surface 1104 and the yoke 802. The additive material used in the additive friction stir welding process may flow into the gap 1106 and the divots 808 to strengthen the transition joint 1102, similar to the process described in detail above.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine," "calculate," and "compute," and variations thereof, as used herein, are used interchangeably and include any type of methodology, process, mathematical operation or technique.

As used herein, the terms "clad" and "cladding" refer to bonding between two dissimilar metals over a relatively large surface area by solid-state welding, e.g., EXW (in contrast to a spot or line weld).

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A dissimilar metal article comprising:
    a first metallic component comprising a first metallic component first end surface;
    a second metallic component comprising a second metallic component first end surface;
    an additive flow material bonded to each of the first metallic component first end surface and the second metallic component first end surface;
    wherein the additive flow material intermixes with the first metallic component and the second metallic component; and
    the additive flow material forms a collar around the first metallic component and the second metallic component at a position radially outward from the first metallic component and the second metallic component.

2. The dissimilar metal article of claim 1, wherein:
    the first metallic component comprises steel or a steel alloy; and
    the second metallic component and the flow material each comprise aluminum or an aluminum alloy.

3. The dissimilar metal article of claim 1, wherein:
    the first metallic component further comprises a first metallic layer, a cladded interlayer, and a second metallic layer;
    the cladded interlayer is explosion welded between the first metallic layer and the second metallic layer; and the second metallic layer is provided adjacent the first metallic component first end surface.

4. The dissimilar metal article of claim 3, wherein:
the first metallic layer comprises steel or stainless steel;
the second metallic layer comprises aluminum or an aluminum alloy; and
the cladded interlayer comprises nickel, stainless steel, nickel alloy, titanium, zirconium, silver, or tantalum.

5. The dissimilar metal article of claim 1, wherein:
a transition joint between the first metallic component first end surface and the second metallic component first end surface
comprises a mechanically intermixed composition formed from the first metallic component, the second metallic component, and the additive flow material.

6. The dissimilar metal article of claim 1, wherein:
the additive flow material forms a transition joint between the first metallic component first end surface and the second metallic component first end surface; and
the transition joint is formed by friction stir welding.

7. The dissimilar metal article of claim 1, wherein:
the collar extends circumferentially around each of the first metallic component and the second metallic component.

8. The dissimilar metal article of claim 1, further comprising:
a recess machined into at least one of the first metallic component outer surface and the first metallic component first end surface; and
a projection formed on an inner surface of the collar, the projection having a corresponding profile to the profile of the recess,
wherein the projection and the recess are physically interlocked.

9. The dissimilar metal article of claim 1, wherein:
each of the first metallic component first end surface and the second metallic component first end surface comprise a planar surface.

10. The dissimilar metal article of claim 1, wherein:
each of the first metallic component first end surface and the second metallic component first end surface comprise an angled or tapered surface;
the first metallic component first end surface comprises a first contacting shoulder; and
the second metallic component first end surface comprises a second contacting shoulder for direct surface contact between the first metallic component and the second metallic component.

11. A method of manufacturing a dissimilar metal article, comprising:

aligning a first metallic component comprising a first metallic component first end surface with a second metallic component comprising a second metallic component first end surface, wherein the first metallic component comprises steel or stainless steel and the second metallic component comprises aluminum or an aluminum alloy;
bonding an additive flow material to each of the first metallic component first end surface and the second metallic component first end surface; and
forming a collar around at least a portion of a first metallic component outer surface and a second metallic component outer surface with the additive flow material;
wherein the step of bonding an additive flow material to each of the first metallic component first end surface and the second metallic component first end surface further comprises mechanically intermixing the metals forming the first metallic component, the second metallic component, and the additive flow material.

12. The method of claim 11, wherein aligning the first metallic component with the second metallic component further comprises:
loading the first metallic component and the second metallic component onto a female jig component;
inserting an end of a male jig component into an open end of the female jig component; and
inserting a locking pin into a pinhole of the male jig component to secure the position of the female jig component, the male jig component, the first metallic component and the second metallic component.

13. The method of claim 11, wherein the first metallic component and the second metallic component comprise pipe segments.

14. The method of claim 11, wherein the bonding is performed by friction stir welding.

15. The method of claim 11, further comprising:
machining a recess into a first metallic component outer surface; and
distributing an additive flow material in the recess to form a projection, thereby interlocking the collar with the first metallic component.

16. The method of claim 11, wherein:
the first metallic component comprises a first metallic layer comprising steel, a second metallic layer comprising aluminum or aluminum alloy, and a cladded interlayer comprising nickel, stainless steel, nickel alloy, titanium, zirconium, silver, or tantalum.

* * * * *